United States Patent
Krejci et al.

(10) Patent No.: US 12,242,587 B2
(45) Date of Patent: *Mar. 4, 2025

(54) ADMINISTERED AUTHENTICATION IN ARTIFICIAL REALITY SYSTEMS

(71) Applicant: Meta Platforms Technologies, LLC, Menlo Park, CA (US)

(72) Inventors: Marc Krejci, North Bend, WA (US); David Scoville, Edmonds, WA (US); Chelsea Klukas, Seattle, WA (US); Matthew O'neil Terrell, Oakland, CA (US); Tristam Kyle MacDonald, Seattle, WA (US); Justin Peng, Redwood City, CA (US); Florian Ludwig, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,658

(22) Filed: Dec. 13, 2023

(65) Prior Publication Data

US 2024/0111854 A1    Apr. 4, 2024

Related U.S. Application Data

(63) Continuation of application No. 18/067,139, filed on Dec. 16, 2022, now Pat. No. 11,880,445, which is a
(Continued)

(51) Int. Cl.
*G06F 21/34* (2013.01)
*G06F 3/01* (2006.01)
(Continued)

(52) U.S. Cl.
CPC .............. *G06F 21/34* (2013.01); *G06F 3/011* (2013.01); *G06F 21/33* (2013.01); *G06F 21/36* (2013.01);
(Continued)

(58) Field of Classification Search
CPC .......... G06F 21/34; G06F 21/33; G06F 21/40; G06F 21/36; G06F 3/011; H04L 9/3271; G06T 19/006
(Continued)

(56) References Cited

U.S. PATENT DOCUMENTS 10,504,292 B1 * 12/2019 Goodsitt ............... G07F 19/206
10,789,353 B1 *  9/2020 Taylor .................. G06T 19/006
(Continued)

FOREIGN PATENT DOCUMENTS

| CN | 114490124 A | 5/2022 |
|---|---|---|
| DE | 102012213027 A1 | 2/2013 |
| WO | 2005045671 A1 | 5/2005 |

*Primary Examiner* — Samson B Lemma
(74) *Attorney, Agent, or Firm* — Potomac Law Group, PLLC; Dannon G. Allbee

(57) ABSTRACT

An administered authentication system can authenticate an artificial reality device using an authorization record between a user account and an artificial reality device. In some implementations, the authorization record is created in response to activation of a user account-specific key sent to a user-supplied contact, where an artificial reality device identifier was provided with the user-supplied contact. In other implementations, the authorization record is created in response to activation of a user account-specific key provided to the artificial reality device as a code, where activation of the key includes adding an artificial reality device identifier to a key activation message. In yet other implementations, the authorization record is created in response to an application associated with a user account activating an artificial reality device-specific key, with an artificial reality device identifier, that is provided via the artificial reality device.

20 Claims, 9 Drawing Sheets

Related U.S. Application Data continuation of application No. 16/742,859, filed on Jan. 14, 2020, now Pat. No. 11,562,059.

(51) Int. Cl.

| | | |
|---|---|---|
| *G06F 21/33* | (2013.01) | |
| *G06F 21/36* | (2013.01) | |
| *G06F 21/40* | (2013.01) | |
| *G06T 19/00* | (2011.01) | |
| *H04L 9/32* | (2006.01) | |

(52) U.S. Cl.
CPC ............ *G06F 21/40* (2013.01); *G06T 19/006* (2013.01); *H04L 9/3271* (2013.01)

(58) Field of Classification Search
USPC ............................................................ 726/4
See application file for complete search history.

(56) References Cited

U.S. PATENT DOCUMENTS

| | | |
|---|---|---|
| 11,039,651 B1 | 6/2021 | Bosworth |
| 11,405,774 B2 | 8/2022 | Amin et al. |
| 11,562,059 B2 | 1/2023 | Krejci et al. |
| 11,758,389 B2 | 9/2023 | Amin et al. |
| 11,880,445 B2 | 1/2024 | Krejci et al. |
| 2013/0346168 A1* | 12/2013 | Zhou ..................... G06F 1/163 |
| | | 701/428 |
| 2015/0058633 A1* | 2/2015 | Liu ..................... H04L 63/0823 |
| | | 713/175 |
| 2015/0347124 A1 | 12/2015 | Sotani et al. |
| 2017/0103440 A1* | 4/2017 | Xing ..................... H04W 12/06 |
| 2017/0115742 A1* | 4/2017 | Xing ..................... G06F 3/0485 |
| 2018/0122142 A1 | 5/2018 | Egeler et al. |
| 2018/0191695 A1* | 7/2018 | Lindemann ......... H04L 63/0853 |
| 2018/0196858 A1 | 7/2018 | Srivastava |
| 2018/0350144 A1* | 12/2018 | Rathod ............. G06Q 20/3224 |
| 2020/0019288 A1 | 1/2020 | D'Amore et al. |
| 2020/0084030 A1* | 3/2020 | Nendell ................ H04L 63/083 |
| 2020/0401687 A1* | 12/2020 | Mak ..................... H04W 12/33 |
| 2020/0404016 A1 | 12/2020 | Pike et al. |
| 2021/0041950 A1* | 2/2021 | von und zu Liechtenstein ........... |
| | | G06F 3/013 |
| 2021/0258308 A1* | 8/2021 | Avetisov ............... H04L 9/0825 |
| 2021/0304511 A1* | 9/2021 | Goodsitt ............... G06T 19/006 |
| 2021/0304706 A1 | 9/2021 | Petrangeli et al. |
| 2022/0092165 A1* | 3/2022 | Keith, Jr. .............. G06F 21/316 |
| 2023/0107624 A1* | 4/2023 | Keith, Jr. ................ G06F 21/32 |
| | | 704/249 |
| 2023/0152936 A1 | 5/2023 | Inch et al. |
| 2023/0176852 A1 | 6/2023 | Senda |
| 2023/0351710 A1 | 11/2023 | Doyle et al. |
| 2024/0022565 A1* | 1/2024 | Keith, Jr. ............ H04L 63/0861 |
| 2024/0061669 A1 | 2/2024 | Taylor et al. |

\* cited by examiner

ADMINISTERED AUTHENTICATION IN ARTIFICIAL REALITY SYSTEMS

RELATED APPLICATIONS

This application is a continuation of U.S. application Ser. No. 18/067,139, entitled "Administered Authentication in Artificial Reality Systems," filed on Dec. 16, 2022 and currently which is a continuation of U.S. application Ser. No. 16/742,859, entitled "Administered Authentication in Artificial Reality Systems," filed on Jan. 14, 2020, now U.S. Pat. No. 11,562,059 issued on Jan. 24, 2023, the entire content of both applications is hereby incorporated by reference in their entirety.

TECHNICAL FIELD

The present disclosure is directed to an authentication system for administering artificial reality device authentication.

BACKGROUND

Artificial reality devices provide users the ability to experience different worlds, learn in new ways, and make better connections with others. With these artificial reality systems come new interaction flows and opportunities to integrate with other systems. For example, an artificial reality system can allow users to interact with other devices while integrating simultaneous display of real-world and virtual objects. Despite these abilities, artificial reality systems have generally implemented traditional authentication flows, such as requiring users to painstakingly enter credentials and verification codes.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
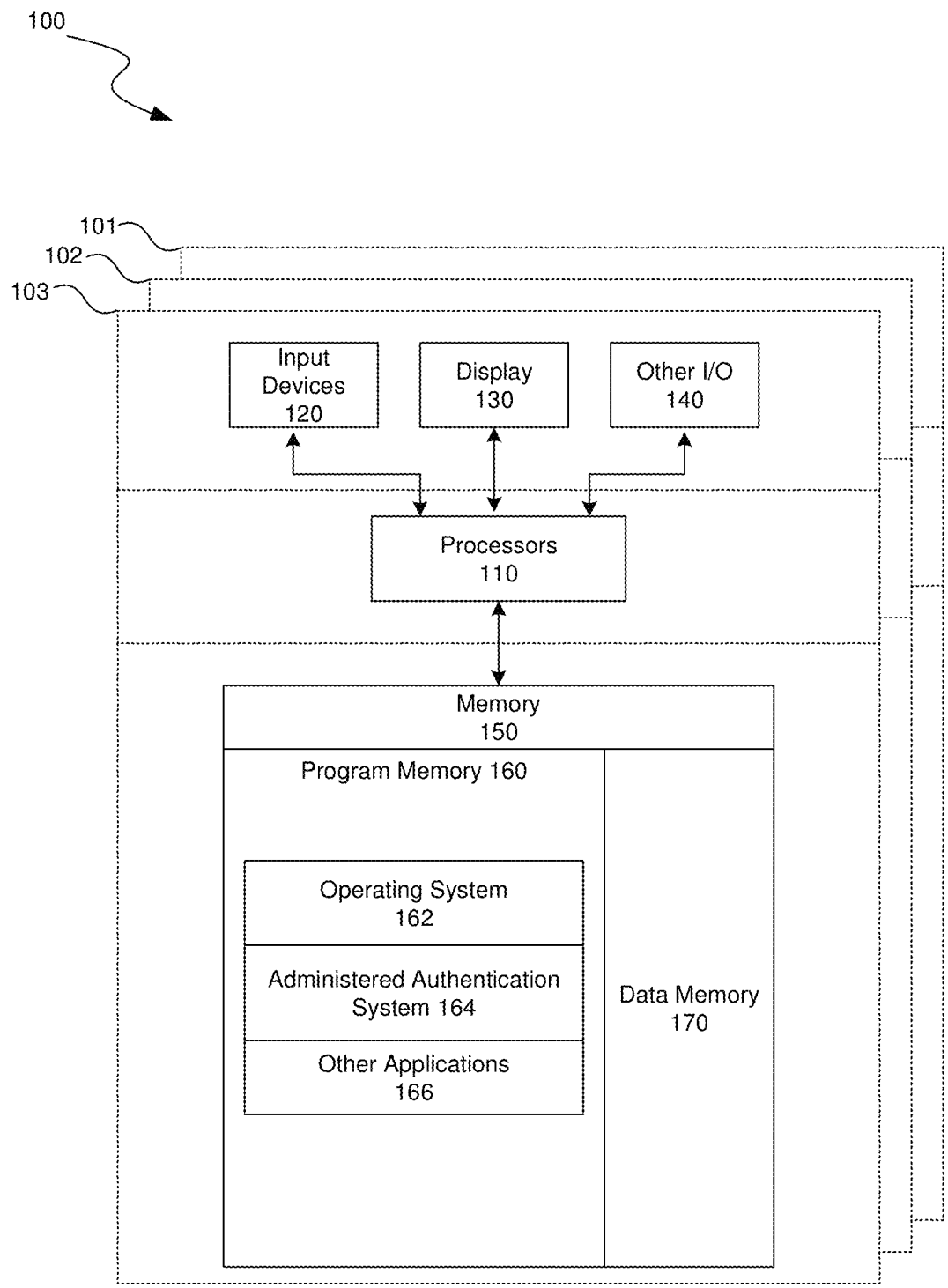
FIG. 1 is a block diagram illustrating an overview of devices on which some implementations of the present technology can operate.

Embodiments are described herein for administering authentication by creating authorization records between user accounts and artificial reality devices. In some implementations, an authorization record can be created via activation of a user account-specific key with an associated artificial reality device identifier. A user account-specific key is a data structure with information identifying a particular user account. In other implementations, an authorization record can be created via activation of an artificial reality device-specific key with an associated user account identifier. An artificial reality device-specific key is a data structure with information identifying a particular artificial reality device. Activation of either type of key allows an authentication system to pair a particular user account specified by the user identifier with the particular artificial reality device.

The authentication system can make this pairing as an authentication record between the user account and the artificial reality device and can use the authentication record to authenticate the user with the artificial reality device. The authentication system can then provide a confirmation to the artificial reality device that the user account has been authenticated, allowing the user associated with the user account to use the artificial reality device in an authenticated mode.

In some implementations, creating the authorization record is performed via activation of a user account-specific key sent to a user-supplied contact. In these cases, a user can begin using an artificial reality device (e.g., an artificial reality headset) and can supply contact information, such as a phone number, email address, instant message ID, etc. The artificial reality device can send the contact information along with information identifying the artificial reality device (e.g., a serial number, MAC address, or other unique identifier for the artificial reality device) to an authentication system. The authentication system can verify that the contact information corresponds to a previously established user account or can create a new user account and can send a user account-specific key to the contact based on the provided contact information, e.g., via text message, email, instant message, push notification to an application, etc. The user account-specific key can include one or more identifiers that can be mapped to the artificial reality device and an identifier that can be mapped to the user account. The user can receive the user account-specific key via a personal user device, e.g., a mobile phone, PC, etc., and can activate the user account-specific key, such as by activating an included link or other control associated with the user account-specific key. Activating the user account-specific key can send a notification, with the one or more identifiers mapped to the artificial reality device and user account, to the authentication system. This verifies that the user has control over the device or account that was indicated by the verified contact information. In response to this notification, the authentication system can use the one or more identifiers to obtain identifiers for the artificial reality device and the user account, which the authentication system can use to create an authorization record between them. The authentication system can use the authorization record to authenticate the user with the artificial reality device and can send a confirmation to the artificial reality device that the user account has been authenticated, allowing the user associated with the user account to use the artificial reality device in an authenticated mode.

An example of this administered authentication process using a user-supplied contact begins with a user donning an artificial reality device and seeing a prompt to enter her phone number. The user enters a phone number for her text message-enabled mobile device. The artificial reality device sends the phone number and the artificial reality device's serial number over a network connection (e.g., via the internet) to a default address for an authentication system. As used herein, an address is a unique network identifier such as an IP address, phone number, email address, URL, MAC address, or other identifier useable to communicate with a particular system over a network. The authentication system receives the telephone number and locates an existing user account with a matching telephone number previously established with the authentication system, e.g., by an administrator of the artificial reality device. The authentication system saves the artificial reality device serial number in association with the user account and sends a text message to the phone number with a link having an embedded identifier that is mapped to this saved data. The user receives the text at her mobile device and activates the link. The authentication system receives a notification of the link activation and creates an authorization record, e.g., by setting a database entry pairing the artificial reality device to the user account and signifying the user has demonstrated control over the device with the phone number listed in her user account. Creating this authorization record can authenticate the user with the artificial reality device. The authentication system can provide a confirmation of this authentication to the artificial reality device, allowing the user to use the artificial reality device in an authenticated mode.

In other implementations, creating an authorization record is performed via activation of an account-specific key with a code captured by the artificial reality device. In these implementations, an authentication system can create an association between a code and a user account. The authentication system can trigger receipt of a user account-specific key at a user device by sending the code to the user, e.g., using contact information saved in the user account. For example, the authentication system can send the code as a QR code, a barcode, a string of characters, or another encoding. The authentication system can send the code to a contact listed for the user account, such as in an email to an email address, as a text message to a phone number, as a data object to an application associated with the user account, as a printed version mailed to a physical address, etc. In some implementations, the authentication system can provide the code to a third party, such as a company administrator for a company associated with the user account, who can provide a digital or printed version of the code to the user. Alternatively, the user can receive the code at a personal user device, such as mobile device, laptop, desktop, etc. and can either print the code to paper or have the code displayed on a screen. The user can use a camera of the artificial reality device to capture an image of the code and the artificial reality device can recognize it, e.g., using a QR reading algorithm, a barcode reading algorithm, or a text recognition algorithm. In some implementations, the user can enter a textual representation of the code manually to the artificial reality device, e.g., using a virtual keyboard. The artificial reality device can activate the user account-specific key by sending a message to the authentication system with an indication of the code and an identifier for the artificial reality device. The message can be sent to a default server of the authentication system programmed into the artificial reality device previously or using an address (e.g., IP address, URL, etc.) specified in the code. In response to this message, the authentication system can obtain the artificial reality device identifier and user account identifier, which the authentication system can use to create an authorization record between the artificial reality device and the user account. The authentication system can use the authorization record to authenticate the user with the artificial reality device and can send a confirmation to the artificial reality device that the user account has been authenticated, allowing the user associated with the user account to use the artificial reality device in an authenticated mode.

An example of this administered authentication process using codes begins with an authentication system sending an email, to an email address from a user account, with QR code encoding a URL having an embedded identifier for the user account. The user receives the email at her laptop and prints out the QR code. The user dons her artificial reality device and enables a passthrough camera that takes images of the environment and presents them to the user on a display of the artificial reality device. The user positions the printed QR code in front of this camera and a QR reader on the artificial reality device decodes it. This provides the user account-specific key and URL to the artificial reality device, which the artificial reality device activates by further embedding the artificial reality device's serial number in the URL and accessing the URL. The authentication system receives a notification of the URL being accessed, demonstrating the user has control over the email account to which the QR code was sent. The authentication system extracts the user profile identifier and artificial reality device's serial number from the URL. The authentication system uses these identifiers to create an authorization record by setting a database entry pairing the artificial reality device to the user account. This authorization record can serve to authenticate the user with the artificial reality device. The authentication system then provides a confirmation of this authentication to the artificial reality device, allowing the user to use the artificial reality device in an authenticated mode.

In yet further implementations, creating the authorization record is performed via activation of an artificial reality device-specific key via an authenticated application. In these cases, an authentication system can trigger an artificial reality device to receive an artificial reality device-specific key. For example, an administrator of the artificial reality device can cause this by enabling a "require login" procedure on the artificial reality device, which will cause the artificial reality device to generate the artificial reality device-specific key as part of an authentication process. Thus, the artificial reality device can receive the artificial reality device-specific key with a unique device identifier such an encoding of a serial number, from another component of the artificial reality device. The artificial reality device can display this encoding to the user. The user can remove the artificial reality device or enable a passthrough camera, allowing the user to interact with a personal user device while still wearing the artificial reality device. The personal user device, such as a mobile device, can be executing an application that the user has authenticated into her user account. The user can access an option in the application to add a device to her user account and can enter the encoding displayed by the artificial reality device. The personal user device can activate the artificial reality device-specific key by the application sending an indication of the encoding to the authentication system in association with an identifier for the user account with which the application is authenticated. In response, the authentication system can translate the encoding into an artificial reality device identifier and obtain the user account identifier. The authentication system can use these to create an authorization record between the artificial reality device and the user account. The authentication system can use the authorization record to authenticate the user with the artificial reality device and can send a confirmation to the artificial reality device that the user account has been authenticated. This can allow the user to use the artificial reality device in an authenticated mode.

An example of this administered authentication process that uses an artificial reality device-specific key begins with an administrator controlling an artificial reality device to generate an artificial reality device-specific key when accessed by a user. When a user dons the artificial reality device, the artificial reality device generates a text string code based on the artificial reality device's serial number and the code is displayed to the user. The artificial reality device enables a passthrough camera that takes images of the environment and presents them to the user on a display of the artificial reality device. Viewing these images, the user accesses an application on her mobile device with which she previously authenticated herself using the authentication system. The user accesses a tool in the application to add an artificial reality device to her account and enters the code from the artificial reality device-specific key that is being displayed by the artificial reality device as an overlay on the passthrough images. The application provides a notification to the authentication system with an indication of the code and a user account identifier for the user account with which the application is authenticated. The authentication system receives the notification and obtains the user profile identifier and code signifying the artificial reality device serial number. The authentication system uses these identifiers to create an authorization record by setting a database entry pairing the artificial reality device to the user account. This authorization record can serve to authenticate the user with the artificial reality device and the authentication system can provide a confirmation of this authentication to the artificial reality device. This can allow the user to use the artificial reality device in an authenticated mode.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some existing XR systems are administered and require authentication with an authentication system to enable various functionality. However, these XR systems generally require a user to enter lengthy credentials e.g., using virtual keyboards, which can be difficult for many users and has proven unsecure as credentials can be stolen or easily guessed. The administered authentication system and processes described herein overcome these problems associated with existing administered XR systems and are expected to provide users with a faster and more secure authentication process. The administered authentication system and processes described herein are rooted in computerized artificial reality systems, instead of being an analog of traditional authentication procedures. For example, existing authentication procedures cannot take advantage of XR device features such as passthrough mode and interactions between an artificial reality device and a personal user device. Furthermore, existing XR systems do not allow a system administrator to effectively control authentication procedures for groups of devices nor do they tie them into available systems, such as previously authenticated mobile applications and user accounts.

Several implementations are discussed below in more detail in reference to the figures. FIG. 1 is a block diagram illustrating an overview of devices on which some implementations of the disclosed technology can operate. In some cases, the devices can comprise hardware components of an authentication computing system 100 that can administer authentication procedures for an artificial reality device using authorization records between user accounts and artificial reality devices. In other cases, the devices can comprise hardware components of an artificial reality device computing system 100 to be authenticated with the authentication computing system. In yet other cases, the devices can comprise hardware components of a personal user device computing system 100 that facilitates communications with the user, the artificial reality device, and/or the authentication system during authentication. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, administered authentications system 164, and other application programs 166. Memory 150 can also include, for example, data memory 170 that can include user account-specific keys, artificial reality device-specific keys, user profiles, authorization codes, authorization records, contact information, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
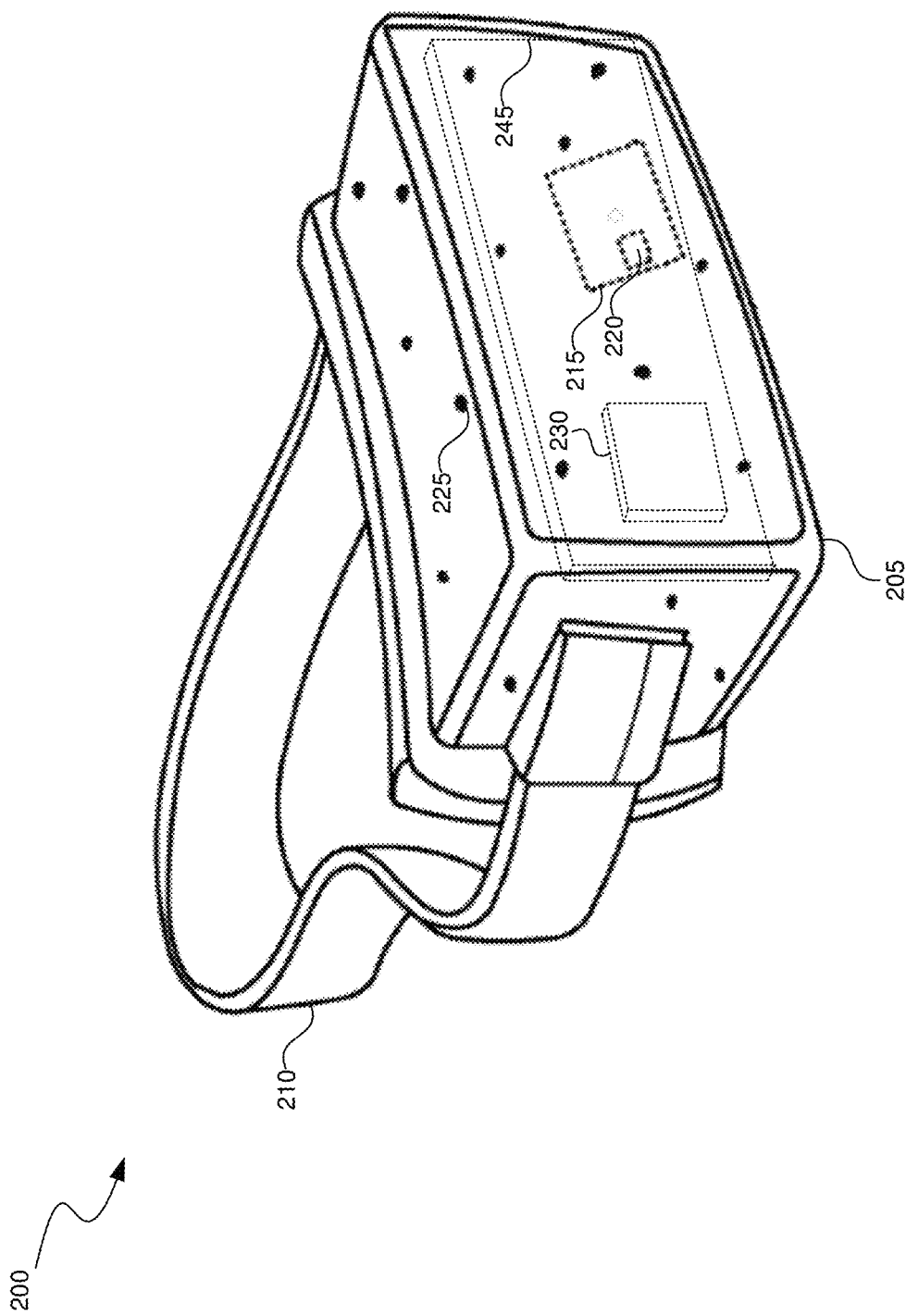
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, Lauthentication systemER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
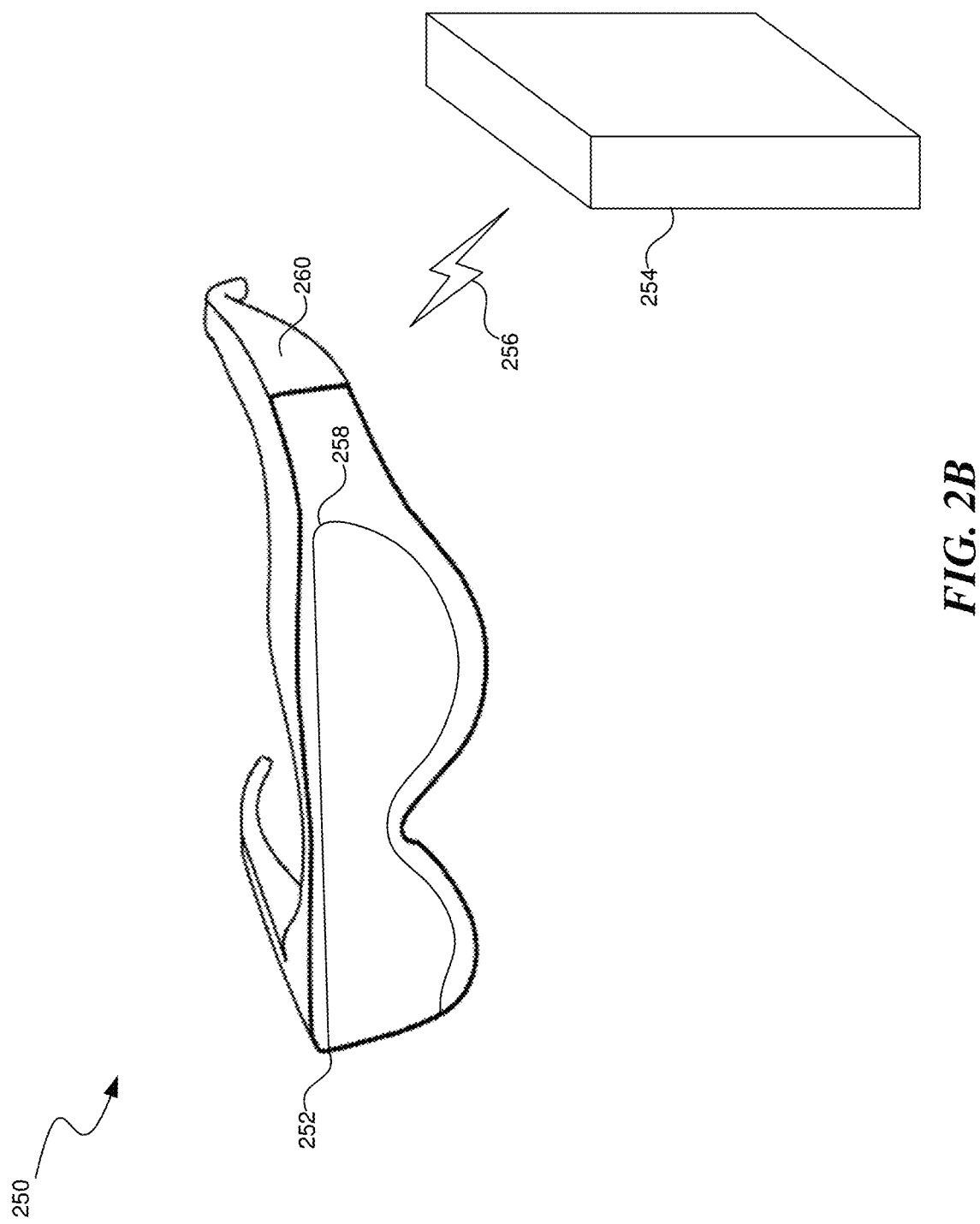
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., Lauthentication systemERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
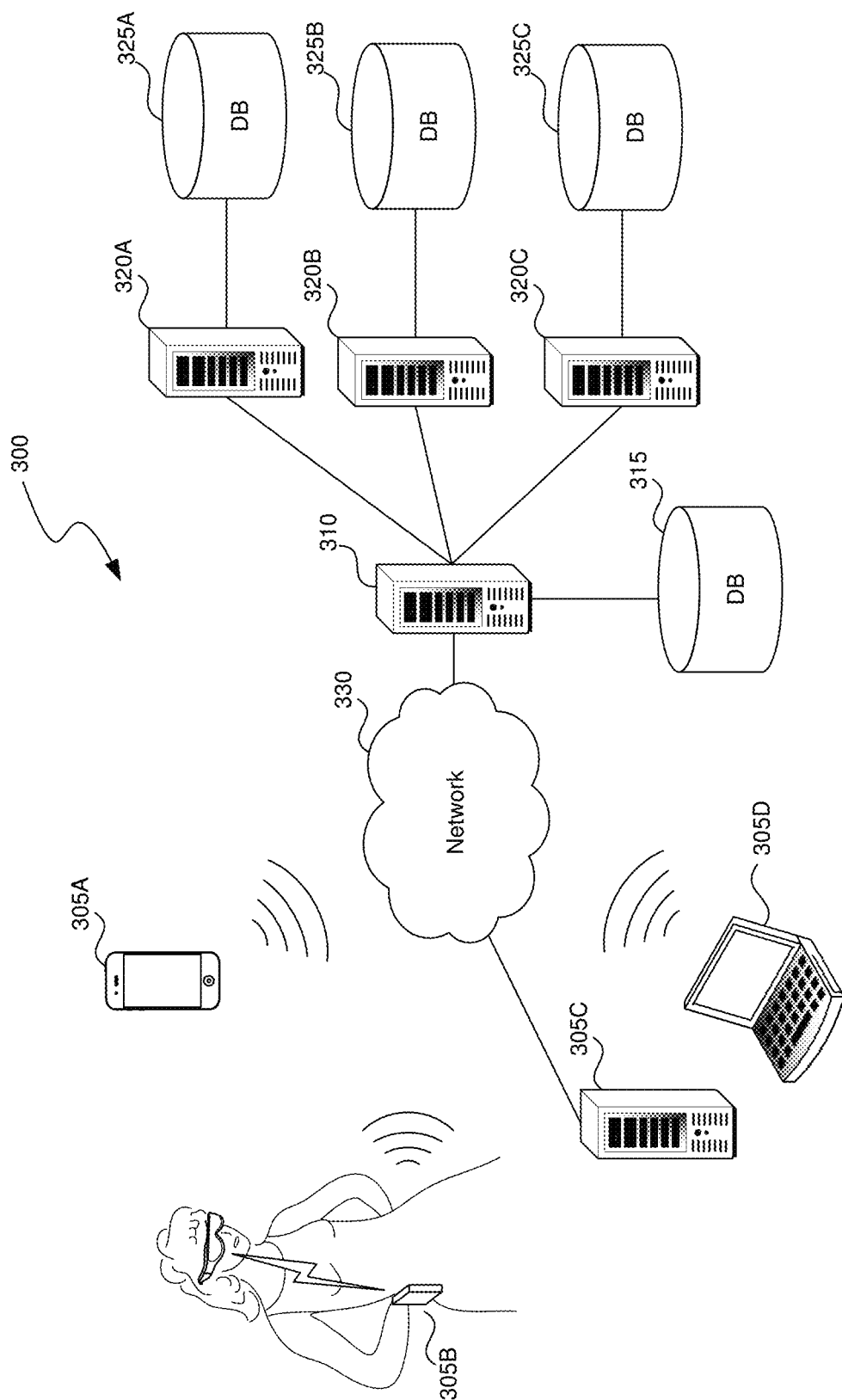
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
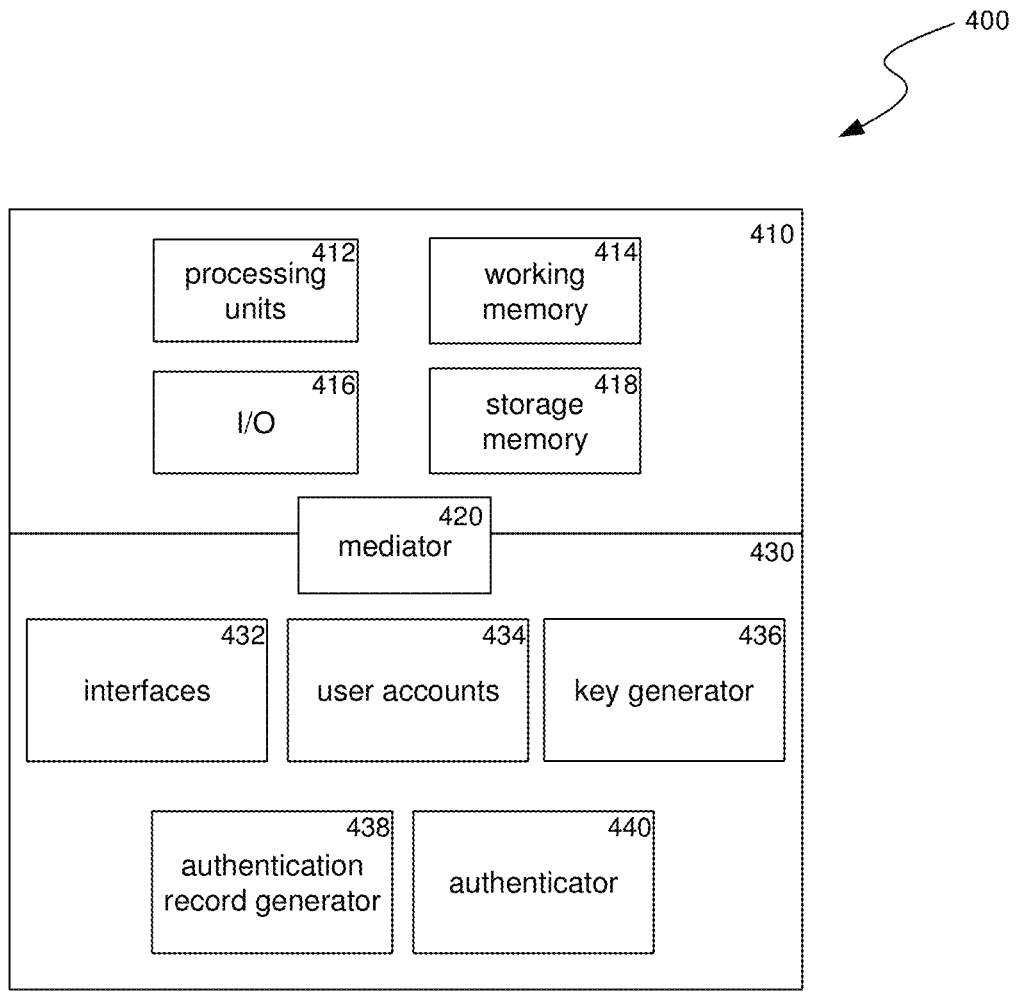
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430, when they are included in an authentication system, can include software or hardware configured to perform operations for authenticating an artificial reality device user. Specialized components 430 can include user accounts 434, key generator 436, authentication record generator 438, authenticator 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430.

User accounts 434 can be database entries or other repositories including user information such as contact information, credentials, biographic data, or user specific information.

Key generator 436 can generate user account-specific keys (e.g., data structures with an identifier mapped to a user account) or artificial reality device-specific keys (e.g., data structures with an artificial reality device identifier), where the keys can be provided to a user device (e.g., a personal user device or artificial reality device) for activation, and where the activation delivers back a user account identifier in association with an artificial reality device identifier.

Authentication record generator 438 can receive messages from key activations, verify that they are valid and, in response, create authentication records. The authentication records are data records indicating a pairing between the user account indicated by the activated key and the artificial reality device indicated by the activated key. For example, the authentication record generator 438 can decrypt key activation messages, lookup a specific user account from user accounts 434, perform validations such as comparing hash values, and enter a database entry associating the specific user account with the artificial reality device.

Authenticator 440 can receive an authentication record and, in response, can perform an authentication procedure, signing the user account into the artificial reality device. For example, this can include accessing permissions assigned to the user account and generating secure messages for the artificial reality device which the artificial reality device can use to enable the functionality that the user account permissions indicate access to. For example, this can include setting flags for features to turn on or off, providing credentials, certificates, or other keys to access data on the artificial reality device or from other remote sources, etc. Authenticator 440 can provide these messages to the artificial reality device, which can use them to provide the authenticated functionality to the user.

In some implementations, hardware 410 can be part of another computing device such as a personal user device, e.g., a mobile phone, laptop, PC, etc. In these instances, specialized components 430 can include other modules, such as an authenticated application on a personal user device that can receive and activate a user account-specific key (see e.g., blocks 606 and 608 discussed below), provide a code from a user account-specific key to an artificial reality device (see e.g., blocks 702 and 704 discussed below), and/or receive and activate an artificial reality device-specific key (see e.g., blocks 804 and 806 discussed below). In other instances, hardware 410 can be part of an artificial reality device, in which case the specialized components 430 can include modules that receive contact information from a user and transmit it to the authentication system (see e.g., block 602 discussed below), capture a code from a user account-specific key and activate the key with a device identifier (see e.g., blocks 706 and 708 discussed below), and/or display a code from an artificial reality device-specific key (see, e.g., block 802 discussed below).

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
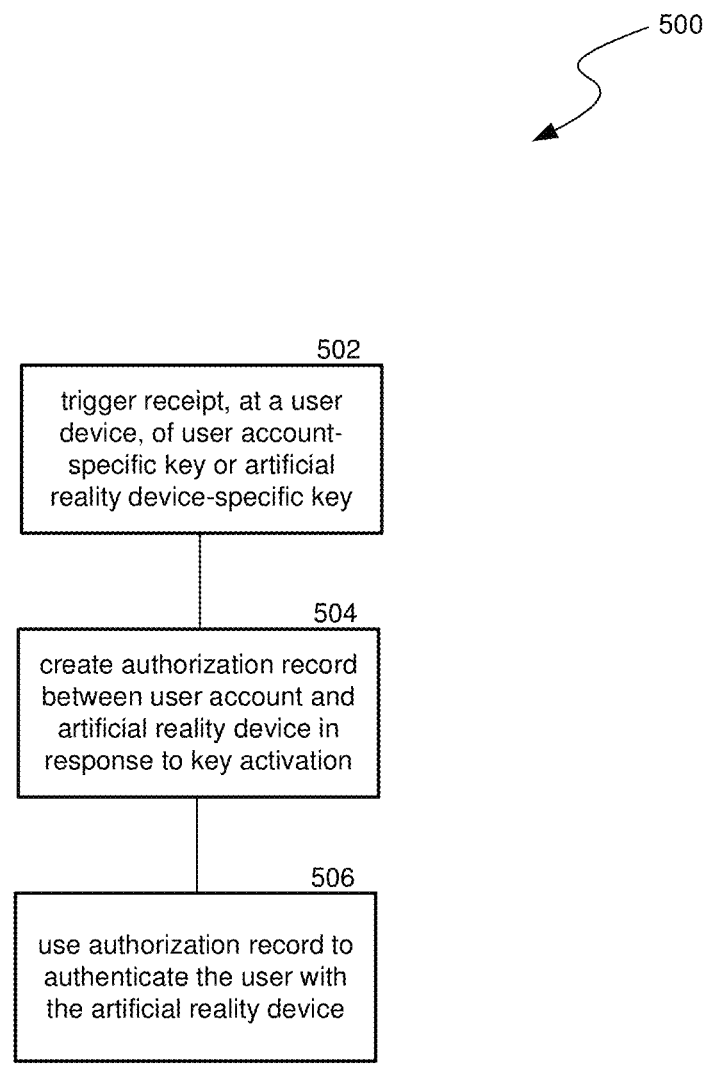
FIG. 5 is a flow diagram illustrating a process used in some implementations of the present technology for administering authentication of an artificial reality device using an authorization record between a user account and an artificial reality device.

FIG. 5 is a flow diagram illustrating a process 500 used in some implementations of the present technology for administering authentication of an artificial reality device using an authorization record between a user account and an artificial reality device. In some implementations, process 500 can be performed by an authentication system, e.g., in response to authentication initiated at a user device.

At block 502, process 500 can trigger receipt, at a user device, of a user account-specific key or an artificial reality device-specific key. A user account-specific key can be a key with an identifier corresponding to a particular user account. An artificial reality device-specific key can be a key with an identifier corresponding to a particular artificial reality device. In some implementations, process 500 can trigger receipt of a key by sending the key from the authentication system to a user device indicated by contact information in a user account or supplied by a user interacting with an artificial reality device (see, e.g., FIG. 6 discussed below). In other implementations, process 500 can trigger receipt of a key by sending a barcode, QR code, or character sequence from the authentication system to a user device (see e.g., FIG. 7 discussed below). In yet other implementations, process 500 can trigger receipt of a key by setting a parameter (e.g., an administrator setting) in the artificial reality device that causes the artificial reality device to generate an artificial reality device-specific key for use in an authentication procedure (see, e.g., FIG. 8 discussed below).

At block 504, process 500 can create an authorization record between a user account and an artificial reality device in response to key activation. When a user account-specific key is activated, it can be associated with an identifier for an artificial reality device. Similarly, when an artificial reality device-specific key is activated, it can be associated with an identifier for a user account. For example, key activation can include activating a hyperlink with an artificial reality device and a user account identifier embedded, sending a TCP/IP or other network message to a designated authentication system server specifying the artificial reality device and user account identifiers, sending an email, text, or instant message with the artificial reality device and user account identifiers, etc. Upon receipt of the key activation, process 500 can create an authorization record, which is an association between the indicated user account and the indicated artificial reality device. Such an authorization record can be a database record, a field set in an existing database record, a data structure held in running memory, etc. In some implementations, before creating the authorization record, process 500 can perform various validations of the key activation, such as checking signatures, performing decryptions, validating authorization levels, etc.

At block 506, process 500 can use the authorization record created at block 504 to authenticate the user account with the artificial reality device. Authenticating the user account can include determining rights (e.g., data access permissions, execution privileges, or other usage parameters) allocated to the user account and providing credentials, certificates, or other keys that allow the user to exercise those rights. For example, the authentication system can send a certificate to an artificial reality device which the artificial reality device can use to provide the user access to stored or online content and/or enable device functionality.

In some implementations, the user's authentication can last a certain period of time or until a de-authorization event is triggered. These logout features can be set up and configured by an administrator of the artificial reality device and/or authentication system. In various implementations, the administrator can configure de-authenticating the user upon expiration of a pre-established session duration, upon the user activating a sign-out control element, and/or upon detecting that the artificial reality device has been removed from the user's head.

Figure 6:
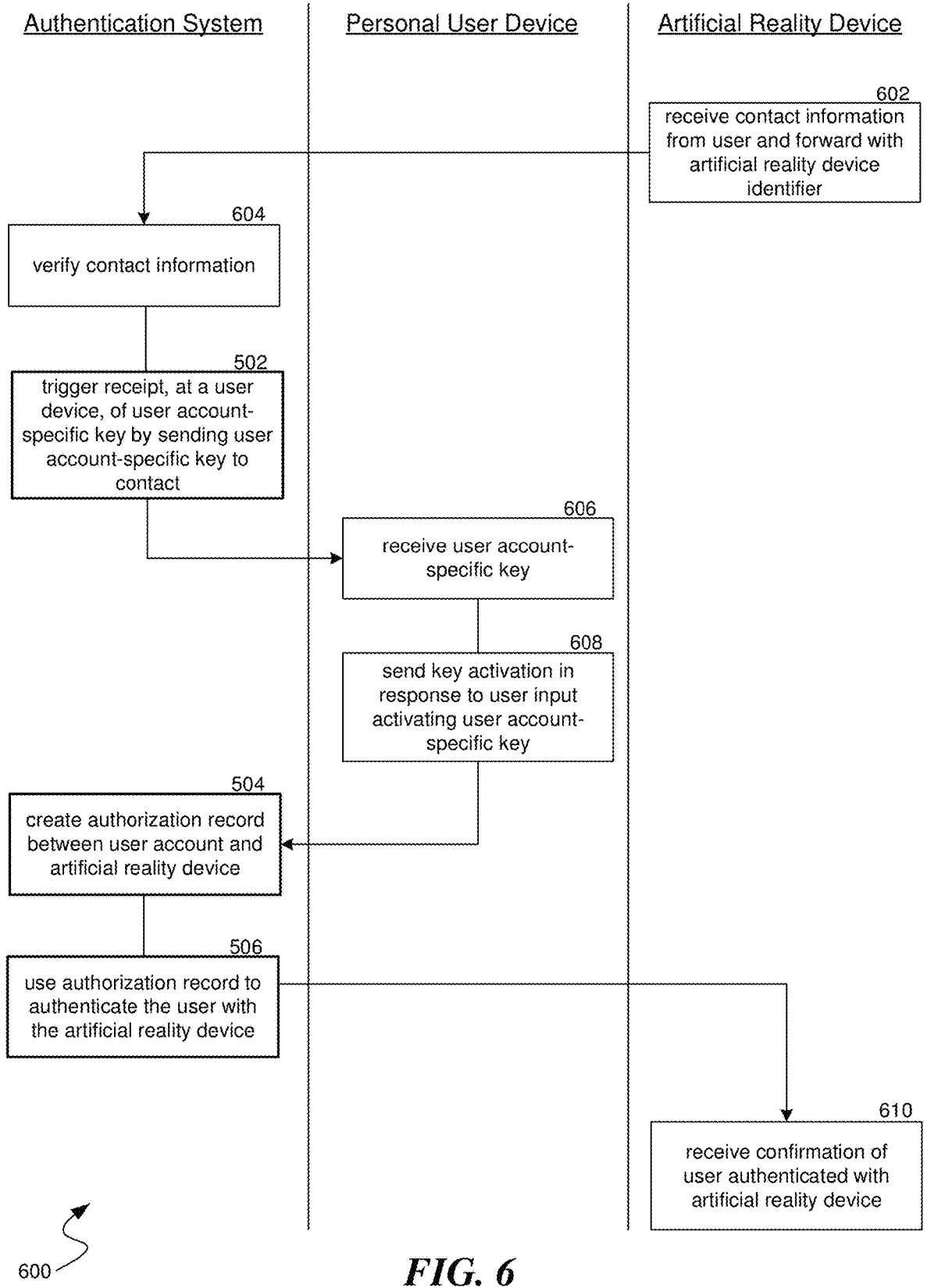
FIG. 6 is a flow diagram illustrating a process used in some implementations of the present technology for creating an authorization record via activation of an account-specific key sent to a user-supplied contact.

FIG. 6 is a flow diagram illustrating a process 600 used in some implementations of the present technology for creating an authorization record via activation of an account-specific key sent to a user-supplied contact. Process 600 elaborates on some implementations of process 500, showing interactions in these implementations between the authentication system performing process 500 and actions by a personal user device and an artificial reality device.

In some implementations, before beginning process 600, an administrator can perform various configuration procedures. For example, the administrator can setup user accounts and/or verify that user accounts have correct contact information, can select whether the authentication procedure will require one-factor or two-factor authentication, and/or can establish logout conditions, such as a duration for which an authentication will permit authenticated use of the artificial reality device.

At block 602, an artificial reality device can display a prompt for a user to enter contact information, such as a phone number, email address, instant message ID, etc. The user can enter the contact information and the artificial reality device can send it along with an identifier for the artificial reality device (e.g., a manufacturer-assigned unique identifier, such as a serial number) to an authentication system.

At block 604, the authentication system can receive the contact information and artificial reality device identifier and can verify that the contact information is associated with a user account. In some implementations, if the contact information is not associated with a user account, the authentication system can create a user account with the contact information. Once the contact information is verified and a corresponding user account has been identified, process 600 can continue to the version of block 502 in FIG. 6. In this version of block 502, process 600 can trigger receipt, at a personal user device (e.g., mobile phone, laptop, etc.), of a user account-specific key that includes an identifier mapped to the identified user account. This version of block 502 can include sending this user account-specific key to the contact specified by the user-provided contact information. In some implementations, the mobile device can include an application with which the user account has been authenticated, the user account-specific key is sent to the application.

In some implementations, the user account-specific key can include a mechanism for activating the key. For example, the authentication system can send a text message, email, instant message, or push notification, to the personal user device based on the contact information, with a link or other control that the user can activate, or the personal user device can automatically activate. As a more specific example, the authentication system can send a text message to a user-provided telephone number, where the link has an embedded identifier mapped at the authentication system to a user account. In some implementations, the authentication system can store a pairing between the user account identifier and the artificial reality device identifier, or the authentication system can include both the user account identifier and the artificial reality device identifier in the key.

At block 606, the personal user device can receive the user account-specific key from the authentication system. In some implementations, at block 608, the personal user device can receive a user input activating the user account-specific key. In other implementations, the personal user device can automatically activate the user account-specific key. In various implementations, activation of the user account-specific key can include a user activating a link or other control included in a message from the authentication system or can include an application automatically sending a message to the authentication system to activate the user account-specific key. In various implementations, this activation can include sending a network message to an address included in the user account-specific key or to a default address, e.g., previously loaded into the personal user device as part of an application associated with the artificial reality device. This link activation or other message can indicate the identifier for the stored pairing of the user account identifier and the artificial reality device identifier or can indicate both the user account identifier and the artificial reality device identifier. In some implementations where the user account-specific key is sent to the authenticated application, the application can respond by activating the user account-specific key with a verification that the user account has been authenticated on the mobile device.

At the version of block 504 in FIG. 6, process 600 can create an authorization record between the user account mapped to the identifier in the activated key and the artificial reality device associated with that identifier (either received with the notification of the user account-specific key activation or stored at the authentication system in a pairing with the user account identifier). The authorization record can be written to a database, set as a parameter in memory, or created as another type of association between the indicated user account and the indicated artificial reality device. In some implementations, creating the authorization record can include validations of the key activation, such as checking signatures, performing decryptions, validating authorization levels, etc.

At the version of block 506 in FIG. 6, process 600 can use the authorization record created at the version of block 504 in FIG. 6 to authenticate the user account with the artificial reality device. Authenticating the user account can include determining rights (e.g., data access permissions, execution privileges, or other usage parameters) allocated to the user account and providing credentials, certificates, or other keys that allow the user to exercise those rights. For example, the authentication system can send a certificate to an artificial reality device which the artificial reality device can use to provide the user access to stored or online content and/or enable device functionality.

At block 610, the artificial reality device can receive the confirmation that the user has been authenticated. In response to the confirmation, the artificial reality device can allow the user access to features corresponding to the user's authentication level and can allow the user to provide authenticated credentials, certificates, etc. to third party systems to access additional services and/or data. The user can remain authenticated until one of various conditions occur, depending on the configuration of the system. In various implementations, the de-authenticating conditions can be expiration of a pre-established session duration; the user activating a sign-out control element; and/or detecting that the user has removed the artificial reality device from the user's head.

Figure 7:
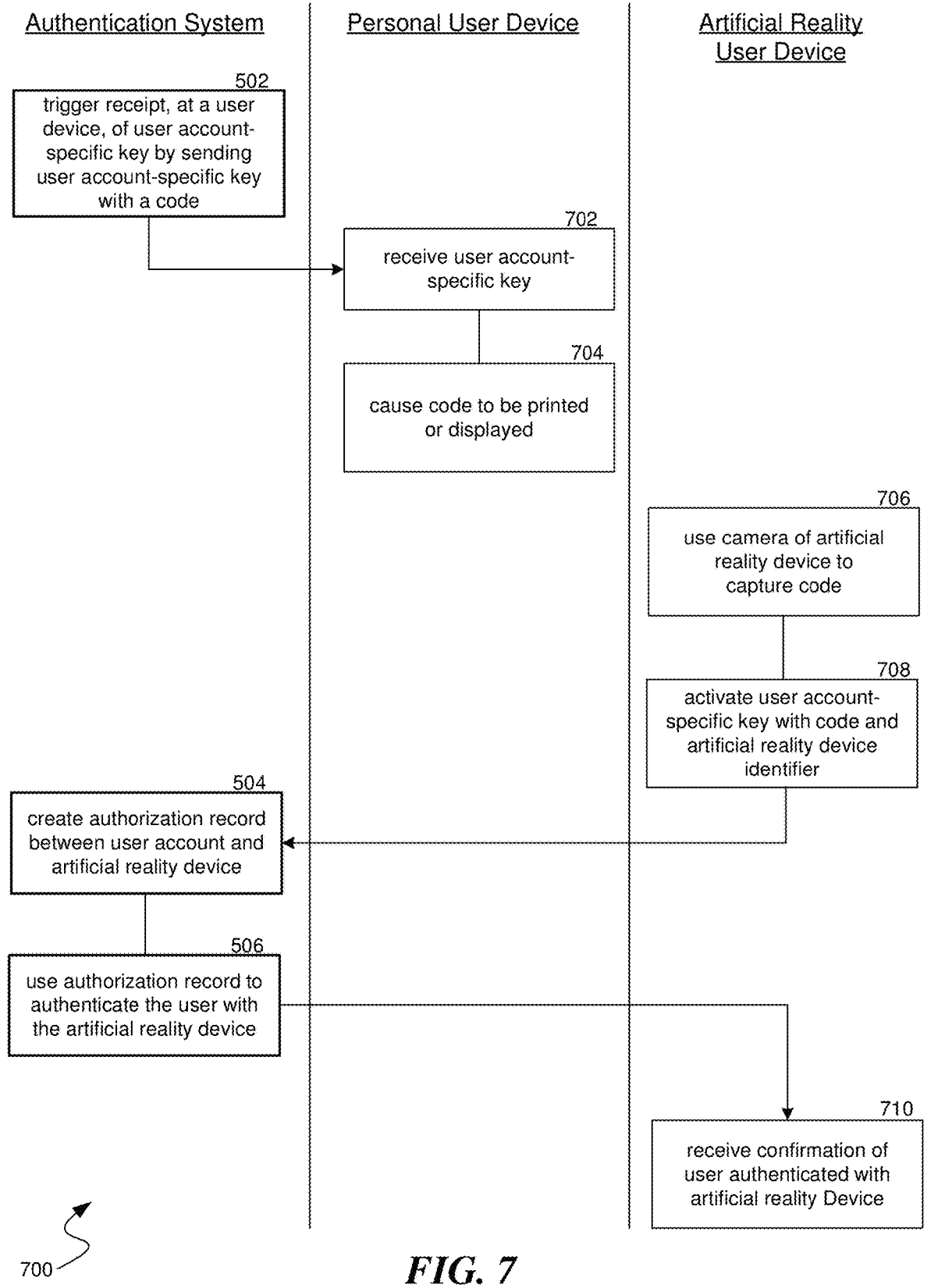
FIG. 7 is a flow diagram illustrating a process used in some implementations of the present technology for creating an authorization record via activation of an account-specific key using a code captured by the artificial reality device.

FIG. 7 is a flow diagram illustrating a process 700 used in some implementations of the present technology for creating an authorization record via activation of an account-specific key with a code captured by the artificial reality device. Process 700 elaborates on some implementations of process 500, showing interactions in these implementations between the authentication system performing process 500 and actions by a personal user device and an artificial reality device.

In some implementations, before beginning process 700, an administrator can perform various configuration procedures. For example, the administrator can set up user accounts, set up an event to create codes for users, specify when and how codes will be sent to users (e.g., via email, text message, push notifications to an application associated with the user account, etc.), and/or establish logout conditions, such as a duration for which an authentication will permit authenticated use of the artificial reality device.

At the version of block 502 in FIG. 7, process 700 can trigger receipt, at a personal user device, of a user account-specific key by sending the user account-specific key to a personal user device. The user account-specific key can include a code mapped to a specific user account. In various implementations, the user account-specific key can include a barcode, a QR code, a string of characters, or another computer-recognizable code. The user account-specific key can be sent to a contact identified in that user account, e.g., as a text message to a telephone number, an email to an email address, a push notification to an application on the personal user device signed into the authentication system with the user account, a paper mailing to a physical address, etc. In some implementations, the code can be included in a physical device, such as an integrated circuit, which can be mailed or otherwise delivered to the user to be physically connected to the artificial reality device, e.g., via a USB port. In some implementations, the code can include additional information, such as a link or other address to use when activating the user account-specific key. As a more specific example, the authentication system can send an email to an email address specified in a user account with a QR code, where the QR code can encode a URL for a server of the authentication system with an embedded identifier for the user account.

At block 702, the personal user device can receive the user account-specific key sent by the authentication system at the version of block 502 in FIG. 7. The personal user device can receive the user account-specific key from a physically connected hardware device, in an email message, in a text message, via an application associated with the user account, or by another messaging system. At block 704, the personal user device can display the code (e.g., barcode, QR code, character string, etc.) or cause the code to be printed.

At block 706, the artificial reality device can activate a camera and capture an image of the code. In some implementations, while the user is wearing the artificial reality device as a headset, the activated camera can be part of a passthrough system which allows the user to view images from the camera while wearing the headset. This provides a view of the real world without the user having to remove the headset. In some implementations, instead of capturing an image of the code, the user can enter the code, e.g., using a virtual keyboard presented in the artificial reality environment or by speaking it, allowing the artificial reality device to determine a character sequence from transcribing the spoken characters. In various implementations, the artificial reality device can decode the receive image, e.g., by converting an image of a barcode or QR code into a string of characters or another data object. In various implementations, the data object can include a user account identifier and/or a link or other address corresponding to the authentication system.

In alternative implementations, instead of capturing a code delivered to a personal user device, the code can be embedded in a user's employee badge or other identification item. In this implementation, the triggering performed at block 502 would be creating the identification item as the user device and/or supplying the identification item to the user. In these implementations, the data object can be provided to the artificial reality device via a signal emitted from the identification item or by the artificial reality device using a camera to capture an image of the identification item with the code or other user identifier printed on it.

At block 708, the artificial reality device can use the data object to activate the user account-specific key. In some implementations, the artificial reality device can receive a user input activating the user account-specific key. In other implementations, the artificial reality device can automatically activate the user account-specific key. Activation of the user account-specific key can include sending a message to an address for the authentication system. This message can include an identifier, based on the code, that the authentication system can map to the user account in association and the message can be associated with an identifier for the artificial reality device, such as its serial number. In some instances, activation of the user account-specific key can include activating a link or other address indicated by the data object from the code. In other implementations, key activation can include sending a message with the user account identifier and the artificial reality device identifier to an address for the authentication system that was pre-established with the artificial reality device.

At the version of block 504 in FIG. 7, process 700 can create an authorization record between the user account mapped to the identifier in the activated key and the artificial reality device identified by the artificial reality device identifier associated with the key activation. The authorization record can be written to a database, set as a parameter in memory, or can be created as another association between the indicated user account and the indicated artificial reality device. In some implementations, creating the authorization record can include validations of the key activation, such as checking signatures, performing decryptions, validating authorization levels, etc.

At the version of block 506 in FIG. 7, process 700 can use the authorization record created at the version of block 504 in FIG. 7 to authenticate the user account with the artificial reality device. Authenticating the user account can include determining rights (e.g., data access permissions, execution privileges, or other usage parameters) allocated to the user account and providing credentials, certificates, or other keys that allow the user to exercise those rights. For example, the authentication system can send a certificate to an artificial reality device that the artificial reality device can use to provide the user access to stored or online content and/or enable device functionality.

At block 710, the artificial reality device can receive the confirmation that the user has been authenticated. In response to the confirmation, the artificial reality device can allow the user access to features corresponding to the user's authentication level and can allow the user to provide authenticated credentials, certificates, etc., to third party systems to access additional services and data. The user can remain authenticated until one of various conditions occur, depending on the configuration of the system. In various implementations, the de-authenticating conditions can be expiration of a pre-established session duration, the user activating a sign-out control element, and/or detecting that the user has removed the artificial reality device from the user's head.

Figure 8:
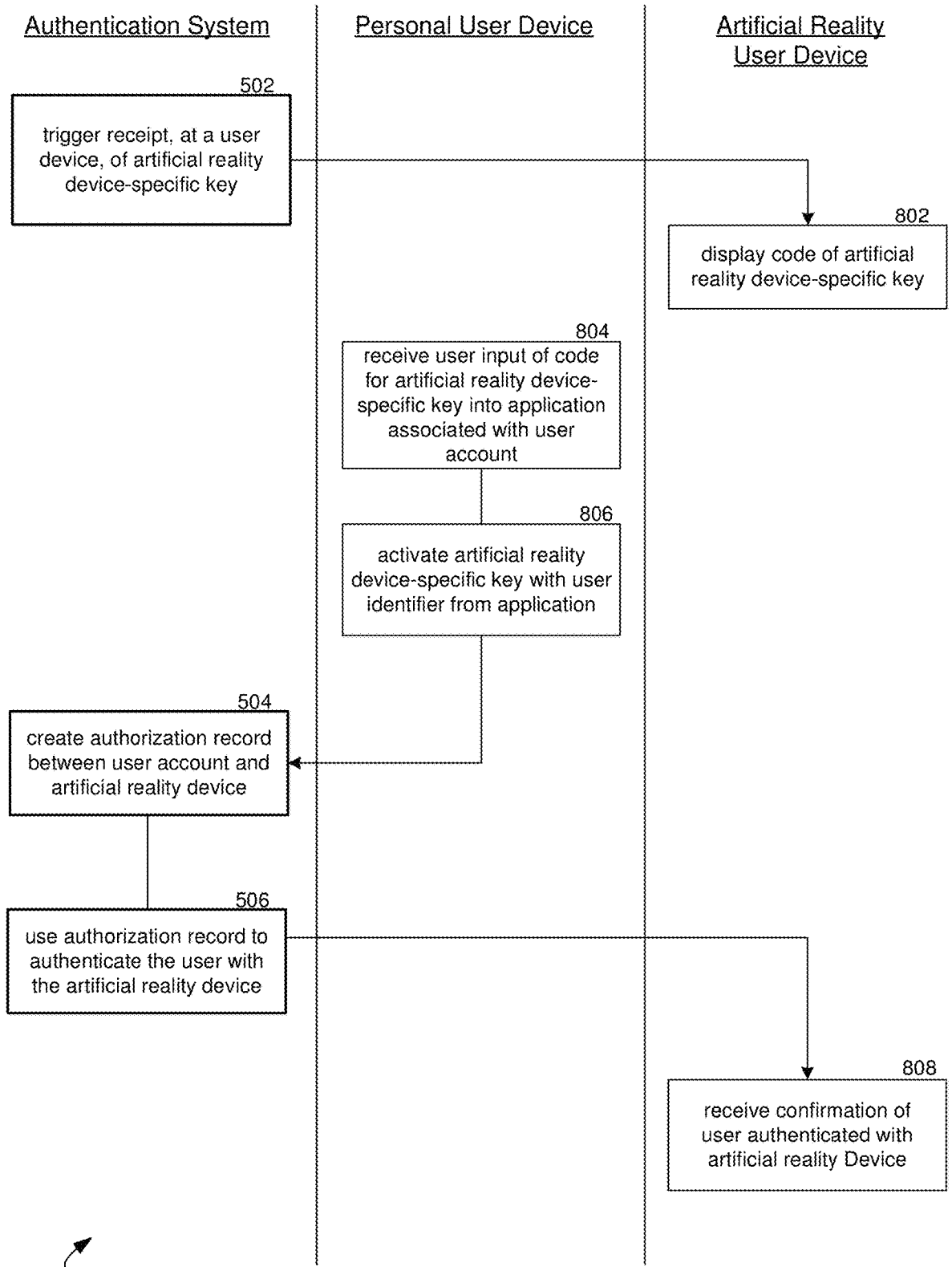
FIG. 8 is a flow diagram illustrating a process used in some implementations of the present technology for creating an authorization record following activation of an artificial reality device-specific key via an authenticated application on a personal user device.

FIG. 8 is a flow diagram illustrating a process 800 used in some implementations of the present technology for creating an authorization record following activation of an artificial reality device-specific key via an authenticated application. Process 800 elaborates on some implementations of process 500, showing interactions in these implementations between the authentication system performing process 500 and actions by a personal user device and an artificial reality device.

In some implementations, before beginning process 800, an administrator can perform various configuration procedures. For example, the administrator can set up user accounts, set up artificial reality device options to require user login, and/or establish logout conditions, such as a duration for which an authentication will permit authenticated use of the artificial reality device.

At the version of block 502 in FIG. 8, process 800 can trigger receipt, at an artificial reality device, of an artificial reality device-specific key, including an identifier specific to the artificial reality device. In some implementations, triggering receipt of the artificial reality device-specific key is performed by establishing a parameter on the artificial reality device, e.g., during an administrator setup procedure, that will cause the artificial reality device to generate the artificial reality device-specific key for use during user authentication. In other implementations, instead of block 502 in FIG. 8 being performed by the authentication system, this step can be performed by the artificial reality device, where a component of the artificial reality device generates the artificial reality device-specific key, e.g., based on the artificial reality device's serial number, MAC address, or other unique identifier. In yet further implementations, block 502 in FIG. 8 can be performed by a separate hardware device in wired or wireless communication with the artificial reality device, such as an external processing component that can interact with the artificial reality device (e.g., via a USB port) to generate the artificial reality device-specific key.

At block 802, the artificial reality device can display a code from the artificial reality device-specific key, specific to the artificial reality device. In some implementations, the artificial reality device can also enable a camera providing a passthrough system which allows the user to view images from the camera while wearing the artificial reality device. The code can be displayed as an overlay on the passthrough image, allowing the user to see the code while interacting with a personal user device without having to remove the artificial reality device. In other implementations, the code can be provided to a personal user device through the user's voice or when the user has removed the headset, in which case the passthrough system may not be used. In yet further implementations, the code can be provided through a connection (e.g., Bluetooth, WiFi, etc.) to the personal user device.

At block 804, the personal user device can receive user or network input, e.g., via a keyboard, voice command, or network connection, specifying the code displayed by the artificial reality device. For example, the user can type or read the code as a string of characters or a phrase. In some implementations, the input can be provided to an application, being executed by the personal user device, with which a user account has been previously associated and/or authenticated.

At block 806, the artificial reality device can receive further user input activating the artificial reality device-specific key or the personal user device can automatically activate the artificial reality device-specific key. Activation of the artificial reality device-specific key can include sending a message to an address for the authentication system with an identifier, based on the code, for the artificial reality device in association with an identifier that the authentication system can map to a user account. The identifier for the user account can be based on the previous association between the application and the user account.

At the version of block 504 in FIG. 8, process 800 can create an authorization record between the artificial reality device identifier from the activated artificial reality device-specific key and the user account mapped to the identifier associated with the activated artificial reality device-specific key. The authorization record can be written to a database, set as a parameter in memory, or created as another association between the indicated user account and the indicated artificial reality device. In some implementations, creating the authorization record can include validations of the key activation, such as checking signatures, performing decryptions, validating authorization levels, etc.

At the version of block 506 in FIG. 8, process 800 can use the authorization record created at the version of block 504 in FIG. 8 to authenticate a user of the user account with the artificial reality device. Authenticating the user account can include determining rights (e.g., data access permissions, execution privileges, or other usage parameters) allocated to the user account and providing credentials, certificates, or other keys that allow the user to exercise those rights. For example, the authentication system can send a certificate to an artificial reality device which the artificial reality device can use to provide the user access to stored or online content and/or enable device functionality.

At block 808, the artificial reality device can receive the confirmation that the user has been authenticated. In response to the confirmation, the artificial reality device can allow the user access to features corresponding to the user's authentication level and can allow the user to provide authenticated credentials, certificates, etc. to third party systems to access additional services and data. The user can remain authenticated until one of various conditions occur, depending on the configuration of the system. In various implementations, the de-authenticating conditions can be expiration of a pre-established session duration; the user activating a sign-out control element; and/or detecting that the user has removed the artificial reality device from the user's head.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method, by an authentication system, for administering authentication procedures for an artificial reality device, the method comprising:
   triggering receipt, at a personal device of a user, a user-account specific key associated with a code, wherein:
      the personal device causes a version of the code to be printed or displayed for an artificial reality device, and
      the artificial reality device receives the code and activates the user-account specific key using the code and a device identifier of the artificial reality device;
   receiving, at the authentication system, an indication of the user-account specific key activation;
   in response to the activation, creating an authorization record between the user account and the artificial reality device; and
   authenticating a user with the artificial reality device via the authorization record.

2. The method of claim 1 further comprising sending, to the artificial reality device, a confirmation that the user has been authenticated, wherein the artificial reality device, in response to the confirmation, allows the user access to features protected by the authentication.

3. The method of claim 1, wherein the triggering receipt of the user-account specific key includes sending, to the personal user device, the user-account specific key via text message, email, instant message, or push notification.

4. The method of claim 1, wherein the artificial reality device receives the code by capturing an image of the printed or displayed version of the code.

5. The method of claim 1, wherein the artificial reality device receives the code by a user providing an input, to the artificial reality device, based on the printed or displayed version of the code.

6. The method of claim 1, wherein the artificial reality device activates the user-account specific key in part by sending a network message to a default network location previously specified with the artificial reality device.

7. The method of claim 1, wherein the user-account specific key includes a reference to a network location and the artificial reality device activates the user-account specific key in part by sending a network message to the network location referenced in the user-account specific key.

8. The method of claim 1, wherein the personal device includes an application with which the user account has been authenticated and the triggering receipt of the user-account specific key at the personal device includes sending the user account-specific key to the application on the personal device.

9. The method of claim 1, wherein the creating the authorization record includes performing one or more validations of the user-account specific key activation including one or more of checking user-account specific key signatures, performing user-account specific key decryption, or performing authorization level verification of the user.

10. The method of claim 1,
   wherein the authorization record is created with a corresponding level of authentication; and
   wherein the artificial reality device receives confirmation of the authenticating and, in response, allows the user access to features corresponding to the level of authentication; and
   wherein the user is de-authenticated and restricted from the access to the features upon detecting that the user has removed the artificial reality device from the user's head.

11. A non-transitory computer-readable storage medium storing instructions that, when executed by a computing system, cause the computing system to perform a process, performed by an authentication system, for administering authentication procedures for an artificial reality device, the process comprising:
   triggering receipt, at a personal device of a user, a user-account specific key associated with a code, wherein:
      the personal device causes a version of the code to be provided to an artificial reality device, and
      the artificial reality device receives the code and activates the user-account specific key using the code and a device identifier of the artificial reality device;

receiving, at the authentication system, an indication of the user-account specific key activation;

in response to the activation, creating an authorization record between the user account and the artificial reality device; and authenticating a user with the artificial reality device via the authorization record.

12. The non-transitory computer-readable storage medium of claim 11, wherein the process further comprises sending, to the artificial reality device, a confirmation that the user has been authenticated, wherein the artificial reality device, in response to the confirmation, allows the user access to features protected by the authentication.

13. The non-transitory computer-readable storage medium of claim 11, wherein the triggering receipt of the user-account specific key includes sending, to the personal user device, the user-account specific key via text message, email, instant message, or push notification.

14. The non-transitory computer-readable storage medium of claim 11, wherein the version of the code to be provided to the artificial reality device is printed or displayed by the personal device, and wherein the artificial reality device receives the code by capturing an image of the printed or displayed version of the code.

15. The non-transitory computer-readable storage medium of claim 11, wherein the artificial reality device receives the code by a user providing an input, to the artificial reality device, based on the version of the code.

16. The non-transitory computer-readable storage medium of claim 11, wherein the artificial reality device activates the user-account specific key in part by sending a network message to a default network location previously specified with the artificial reality device.

17. An authentication computing system, for administering authentication procedures for an artificial reality device, the authentication computing system comprising:
one or more processors; and
one or more memories storing instructions that, when executed by the one or more processors, cause the computing system to perform a process comprising:
triggering receipt, at a personal device of a user, a user-account specific key associated with a code, wherein:
the personal device causes a version of the code to be provided to an artificial reality device, and
the artificial reality device receives the code and activates the user-account specific key using the code and a device identifier;
receiving, at the authentication system, an indication of the user-account specific key activation;
in response to the activation, creating an authorization record between the user account and the artificial reality device; and
authenticating a user with the artificial reality device via the authorization record.

18. The authentication computing system of claim 17, wherein the personal device includes an application with which the user account has been authenticated and the triggering receipt of the user-account specific key at the personal device includes sending the user account-specific key to the application on the personal device.

19. The authentication computing system of claim 17, wherein the creating the authorization record includes performing one or more validations of the user-account specific key activation including one or more of checking user-account specific key signatures, performing user-account specific key decryption, or performing authorization level verification of the user.

20. The authentication computing system of claim 17,
wherein the authorization record is created with a corresponding level of authentication; and
wherein the artificial reality device receives confirmation of the authenticating and, in response, allows the user access to features corresponding to the level of authentication; and
wherein the user is de-authenticated and restricted from the access to the features upon detecting that the user has removed the artificial reality device from the user's head.

* * * * *